United States Patent Office 3,629,231
Patented Dec. 21, 1971

3,629,231
DERIVATIVES OF GLYCYRRHETINIC ACID
Leslie Hough, Wimbledon, London, John Cameron Turner, West Wickham, Kent, and Anthony William Lewis, London, England, assignors to Biorex Laboratories Limited, London, England
No Drawing. Filed May 5, 1969, Ser. No. 821,988
Claims priority, application Great Britain, May 23, 1968, 24,705/68; Nov. 11, 1968, 53,327/68; Mar. 3, 1969, 11,169/69
Int. Cl. C07c 47/18
U.S. Cl. 260—210 R          7 Claims

ABSTRACT OF THE DISCLOSURE

The present invention is concerned with new derivatives of glycyrrhetinic acid and with the preparation thereof. The new derivatives according to the present invention have been found to possess extremely good anti-inflammatory properties, while having very low toxicities.

BACKGROUND OF THE INVENTION

Glycyrrhetinic acid is a known compound with anti-inflammatory properties. However, its limited solubility, especially in water and aqueous solutions, restricts its usefulness. Furthermore, it is obviously of importance to provide new derivatives of glycyrrhetinic acid which not only have improved solubilities but also have a reduced toxicity and an enhanced anti-inflammatory action.

SUMMARY OF THE INVENTION

The new derivatives of glycyrrhetinic acid according to the present invention are compounds of the general formula:

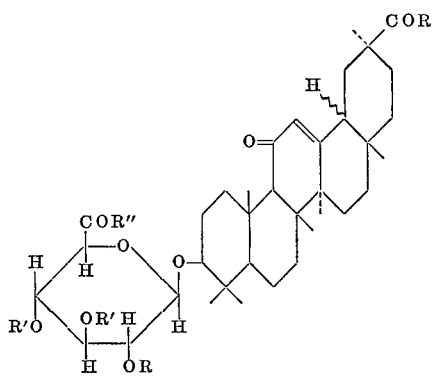

wherein R is a hydroxyl group or an alkoxy radical, R' is a hydrogen atom or an acyl radical and R" is a hydroxyl group or an unsubstituted or substituted amino group or an alkoxy radical; and the salts with non-toxic inorganic and organic bases of those compounds (I) in which R and/or R" is a hydroxyl group.

DETAILED DESCRIPTION OF THE INVENTION

The alkoxy radicals R and R" preferably contain up to 6 carbon atoms and can be straight-chained or branched-chained. Examples of such alkoxy radicals include methoxy, ethoxy, propoxy, isopropoxy and n-butoxy radicals. The acyl radicals R' preferably contain up to 3 carbon atoms, the most preferred acyl radical being the acetyl radical. Alternatively, the acyl radicals R' can be benzoyl radicals. When R" is an amino group, this can be unsubstituted or substituted by one or two straight-chained or branched-chained alkyl radicals, each of which preferably contains up to 6 carbon atoms.

The preferred salts of compounds (I) in which R and/or R" is a hydroxyl group are the alkali metal, alkaline earth metal and ammonium salts, as well as the aluminium and iron salts. The preferred alkali metal and alkaline earth metal salts are the sodium, potassium and calcium salts.

The new compounds (I) can be prepared by the Koenigs-Knorr synthesis by reacting compounds of the general formula:

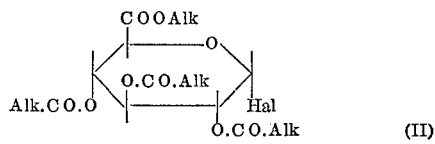

wherein Alk is an alkyl radical and Hal is a halogen atom, preferably a bromine atom, in the presence of excess silver carbonate or silver oxide, with compounds of the general formula:

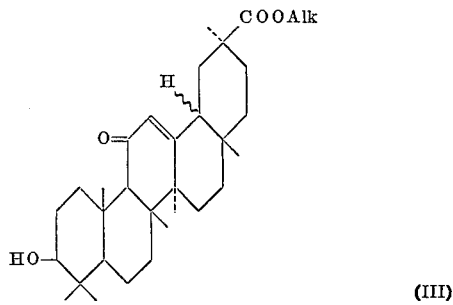

wherein Alk is an alkyl radical, whereafter, if desired, the carboxylic acid groups and the hydroxyl groups in the glucopyranose residue are liberated by hydrolysis or the —COOAlk group in the glucopyranose residue is converted into an unsubstituted or substituted amido group.

According to a preferred method of preparing the new compounds (I), the above-described Koenigs-Knorr synthesis is carried out with the use of a compound of the formula:

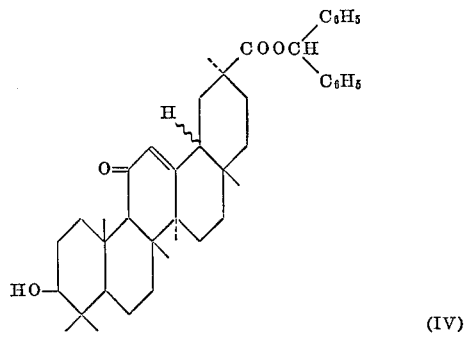

instead of using a compound of general Formula III. As the penultimate stage in this preferred synthesis, the diphenyl-methyl radical is removed to liberate the 30-oic acid group. This removal can readily be carried out by hydrogenolysis in the presence of palladium/charcoal.

The reaction of (II) with (III) or (IV) is preferably carried out in an inert, anhydrous solvent, such as methylene chloride, with the exclusion of atmospheric humidity and of light. Furthermore, although slightly increased or decreased temperatures can be used, good yields are obtained when the reaction is carried out at ambient temperature.

The hydrolysis of the acylated hydroxyl groups and of the esterified carboxylic acid groups can be carried out with the use of an aqueous alcoholic solution of an alkali metal hydroxide, an aqueous methanolic solution of sodium hydroxide being preferred. In this case, the corresponding alkali metal salts are obtained. If desired, these salts can be passed through an appropriate ion exchange resin to give the corresponding free acids which, in turn, can be converted in known manner into the corresponding salts by reaction with an appropriate basic compound.

In order to obtain compounds in which R'' is an amide group, the product obtained by the reaction of (II) with (III) or (IV) is reacted with ammonia or with an appropriate primary or secondary amine in alcoholic, preferably methanolic, solution.

The compounds (II) used as starting materials are either known or can be prepared by known methods (c.f. Bollenback, J.A.C.S., 77, 3310/1955).

The compounds (III) used as starting materials are also either known or can be prepared in known manner, for example, by reacting glycyrrhetinic acid with an appropriate diazo-alkane and the compounds (IV) used as starting materials can be prepared in known manner by reacting glycyrrhetinic acid with diphenyl-diazomethane.

The following examples are given for the purpose of illustrating the present invention:

EXAMPLE 1

0.51 g. (0.0011 mole) methyl 18β-glycyrrhetate was dissolved in 50 ml. dry methylene chloride. 5 g. anhydrous calcium sulphate (available under the registered trademark "Drierite"), 2.5 g. "active" silver carbonate and a few crystals of iodine were added. A solution of 2.5 g. (0.0063 mole) methyl (2,3,4-tri-O-ocetyl-1-bromo-1-deoxy-α-D-glucopyranosyl)-uronate in 25 ml. dry methylene chloride were added dropwise, followed by a further 25 ml. dry methylene chloride. The flask containing the reactants was closed by a drying tube containing "Drierite" to prevent the ingress of moisture and was wrapped in aluminium foil to protect the reaction mixture from light. The reaction mixture was stirred continuously at ambient temperature for 2 hours and then filtered through a pad of diatomaceous earth (that known under the registered trademark "Celite"). Evaporation of the filtrate in a rotary evaporator gave 2.99 g. of a syrup (A).

This syrup was chromatographed on 200 g. Davidson silica gel grade 950 (60/200 mesh), using 1,2-dichloroethane/diethyl ether (2:1 v./v.) as eluting agent. The effluent was collected and examined by thin layer chromatography until all of the pure glycoside had been obtained. The effluent was evaporated in a rotary evaporator and crystallised by the addition of a little diethyl ether. The yield from three crops of crystals was 0.597 g. (70% of theory) of methyl (methyl-18β-glycyrrhet-3β-yl-2',3',4'-tri - O - acetyl-β-D-glucopyranosid)-uronate (I: R=R''=$CH_3O$; R'=$CH_3CO$) in the form of a white powder with a melting point of 163–166° C.

Analysis.—$C_{44}H_{63}O_{13}$ (M.W. 799.99): Calc. (percent): C, 66.00; H, 8.00. Found (percent): C, 65.75; H, 8.19.

The triacetyl compound can also be isolated from the above-mentioned syrup (A) directly by seeding with an authentic crystal but the yield obtained is reduced to about 40% of theory.

The infra-red spectrum of the triacetyl compound shows bands at 1655 cm.$^{-1}$ and at 1760 cm.$^{-1}$, indicating the presence of an α,β-unsaturated ketone system and of —O— acetyl groups. The absence of a band at 3300 cm.$^{-1}$ indicated the absence of hydroxyl functions.

The NMR spectrum (100 mc./a.) shows a doublet for $H_1$ at δ=5.54 with a wide splitting (7 c.p.s.) indicating that the $H_1H_2$ are trans-diaxial in conformation and that, as expected, the glycosidic linkage is β.

EXAMPLE 2

0.098 g. methyl (methyl-18β-glycyrrhet-3β-yl-2',3',4'-tri-O—acetyl-β-D-glucopyranosid)-uronate (obtained as in Example 1) was suspended in anhydrous methanol, gaseous ammonia was then bubbled through the solution for a few minutes and the reaction mixture thereafter left to stand overnight in a refrigerator. The reaction mixture was then evaporated to dryness to give a white solid which was crystallised from hot aqueous methanol. The yield from two crops of crystals was 0.054 g. (about 67% of theory) of the amide of methyl (18β-glycyrrhet-3β-yl-β-D-glucopyranosid)-uronic acid (I: R=$CH_3O$; R'=H; R''=$NH_2$) which has a melting point of 265–275° C.

Analysis.—$C_{37}H_{58}NO_9$ (N.W. 660.88): Calc. (percent): C, 67.47; H, 8.63; N, 2.12. Found (percent): C, 67.75; H, 8.90; N, 2.13.

EXAMPLE 3

0.166 g. methyl (methyl -18β-glycyrrhet-3β-yl-2',3',4'-tri-O—acetyl-β-D-glucopyranosid)-uronate (obtained as in Example 1) was suspended in 10 ml. methanol and 1 ml. 1 N sodium hydroxide solution was added thereto. After standing for one hour at ambient temperature, the solution was de-ionised by passing down a small column of "Amberlite IR–120" (H+) equilibrated with methanol. ("Amberlite" is a registered trademark.) The effluent from the column was evaporated to dryness to give a creamy powder. There was obtained 0.098 g. (about 75% of theory) methyl (18β - glycyrrhet-3β-yl-β-D-glucopyranosid)-uronate (I: R=$CH_3O$; R'=H; R''=OH) which has a melting point of 168–178° C.

EXAMPLE 4

2.7 g. methyl (methyl-18β-glycyrrhet-3β-yl-2',3',4'-tri-O—acetyl-β-D-glucopyranosid)-uronate (obtained as in Example 1) were suspended in 40 ml. dry methanol and 15 ml. 1 N sodium hydroxide solution added, while stirring. Immediately a yellow colour appeared which gradually disappeared and the suspension of the starting material was gradually converted, in the course of 2–3 hours, into a thick white gelatinous precipitate. This precipitate was filtered off, washed with a little methanol, acetone and, finally, with ether and then dried in a vacuum at 45° C. There were obtained 1.8 g. (78% of theory) sodium (methyl - 18β - glycyrrhet - 3β-yl-β-D-glucopyranosid)-uronate (I: R=$CH_3O$; R'=H; R''=ONa). This compound, which is chromatographically homogeneous, melts, with decomposition, at 252–256° C. and dissolves in water to give a "soapy" solution.

EXAMPLE 5

15 g. 18β-glycyrrhetinic acid were dissolved in 300 ml. methanol at about 50° C. A solution of 13 g. diphenyldiazomethane in 50 ml. ether was added in portions until complete esterification was apparent from thin layer chromatography evidence.

The reaction mixture was evaporated to give a red syrup, the red colouration being due to the presence of excess diphenyldiazomethane, which syrup crystallised from di-isopropyl ether/light petroleum (B.P. 40–60° C.) by trituration. Yield of crude product from two crops of crystals: 16.8 g. (84% of theory).

The diphenylmethyl 18β-glycyrrhetate thus obtained was quite suitable for further chemical reactions but purification for analyses was effected by silica gel column chromatography eluting with solvent system chloroform/ether (3:1 v./v.) followed by crystallisation from di-isopropyl ether/light petroleum (B.P. 40–60° C.) to give white needles; M.P. 182°–4° C.; $[\alpha]_D^{20°}$=+139° (c.=0.2 $CHCl_3$).

Analysis.—$C_{43}H_{56}O_4$: Calc. (percent): C, 81.13; H, 8.80. Found (percent): C, 81.00; H, 8.97.

EXAMPLE 6

8 g. diphenylmethyl 18β-glycyrrhetate (obtained as in Example 5) were dissolved in 100 ml. dry methylene chloride and 20 g. freshly prepared silver carbonate, a few crystals of iodine, and 20 g. anhydrous calcium sulphate were added. The mixture was well stirred at ambient temperature for several minutes. A solution of methyl (2,3,4-tri-O-acetyl-1-bromo-1-deoxy - α - D-glucopyranosid)-uronate was added dropwise, followed by a further 50 ml. dry methylene chloride. The reaction mixture was stirred at ambient temperature for 30 minutes, followed by thin layer chromatography examination using chloroform/ether (3:1 v./v.), which showed that the condensation reaction was completed. The reaction mixture was filtered through a pad of Celite and evaporated to give a golden syrup. The desired methyl (diphenylmethyl-18β - glycyrrhet - 3β - yl - 2′,3′,4′-tri-O-acetyl-β-D-glucopyranosid)-uronate was isolated from the syrup in fairly pure form by the trituration with a little ether, followed by filtration of the crystalline product thus obtained. Yield of "crude" product from two crops of crystals: 10.2 g. (ca. 85% of theory). A pure product was obtained by silica gel column chromatography of the syrup, eluting with solvent system chloroform/ether (3:1 v./v.), followed by crystallisation from ether/methylene chloride/ light petroleum (B.P. 40–60° C.); M.P. 147°–53° C.; $[\alpha]_D^{20} = +73°$ (c.=0.2 CHCl$_3$).

EXAMPLE 7

10 g. methyl(diphenyl methyl-18β-glycyrrhet-3β-yl-2′,3′, 4′-tri-O—acetyl-β - D - glucopyranosid) - uronate (obtained as in Example 6) were dissolved in 200 ml. ethyl acetate and 50 ml. ethanol were added, followed by 4 g. palladium catalyst. The reaction mixture was shaken on a Parr hydrogenator with hydrogen (45 p.s.i.) overnight, after which thin layer chromatography, using chloroform/ ether (3:1 v./v.) indicated that all the methyl (diphenyl-methyl-18β-glycyrrhet - 3β - yl - 2′,3′,4′-tri-O-oacetyl-β-D-glucospyranosid)-uronate had been converted to methyl (18β-glycyrrhet - 3β - yl - 2′,3′,4′-tri-O-acetyl-β-D-glucopyranosid)-uronate. The reaction mixture was filtered through a pad of Celite and evaporated to give a syrup which crystallised, on trituration with 96% ethanol, in the form of white plates. Yield from three crops of crystals: 6.0 g. (ca. 74% of theory). Recrystallisation from boiling ethanol gave methyl (18β-glycyrrhet-3β-yl-2′,3′,4′-tri-O—acetyl-β-D-glucopyranosid)-uronate in the form of white plates; M.P. 242°–60° C. (slowly with decomposition); $[\alpha]_D^{20} = +70°$ (c.=0.3 CHCl$_3$).

*Analysis.*—C$_{43}$H$_{62}$O$_{13}$: Calc. (percent): C, 65.52; H, 7.88. Found (percent): C, 65.21; H, 7.66.

EXAMPLE 8

3 g. methyl 18β-glycyrrhet-3β-yl-2′,3′,4′-tri-O—acetyl-β-D-glucopyranosid)-uronate (obtained as in Example 7), 25 ml. pure methanol and 15 ml. 1 N potassium hydroxide solution were stirred at ambient temperature for several minutes, until total dissolution was obtained, and then refrigerated for 2–3 hours. A little cold ether was added, giving a turbid solution which was evaporated to dryness. The resulting white solid was redissolved in a little methanol and crystallisation induced by the addition of a little ether, followed by trituration. The crystalline material was left under solvent overnight, before filtration and washing with a little methanol. The product obtained was dried in vacuo at ambient temperature over sodium hydroxide, calcium chloride and paraffin wax. Yield, 2.5 g. (ca. 80% of theory). This product, which was the potassium (potassium 18β-glycyrrhet-3β-yl-β-D-glucopyranosid)-uronate, was chromatographically homogeneous (thin layer chromatography using the solvent system) ethylene dichloride/n-butanol/glacial acetic acid/water (4:1:4:1 v./v.), water-soluble, giving a "soapy" solution and had a liquorice taste similar to that of glycyrrhizic acid. M.P. 245°–55° C. (slowly with decomposition); $[\alpha]_D^{23°} + 80°$ (c.=0.7 in. aq. EtOH).

The present invention also includes within its scope pharmaceutical compositions containing one or more of the new compounds of general Formula I. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one active compound of general Formula I is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of adsorbable material, such as gelatine, containing at least one of the active substances of general Formula I, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the desired therapeutic effect shall be obtained. In general, the preparation of the present invention should be administered, in the case of oral administration, to give 20 to 800 mg. of active substance per day and, in the case of parenteral administration, 10 to 500 mg. of substance per day.

The following examples illustrate pharmaceutical compositions according to the present invention:

EXAMPLE 9

200 mg. tablets are prepared containing:

| | Mg. |
|---|---|
| Potassium (potassium 18β-glycyrrhet-3β-yl-β-D-glucopyranosid)-uronate | 50 |
| Starch | 145 |
| Magnesium stearate | 5 |

EXAMPLE 10

150 mg. tablets are prepared containing:

| | Mg. |
|---|---|
| Sodium (methyl - 18β - glycyrrhet-3β-yl-β-D-glucopyranosid)-uronate | 35 |
| Starch | 90 |
| Lactose | 20 |
| Magnesium stearate | 5 |

When the compositions according to Examples 9 and 10 were administered to humans, they exerted a pronounced anti-inflammatory action and are, consequently,

We claim:
1. A glycyrrhetinic acid derivative of the formula

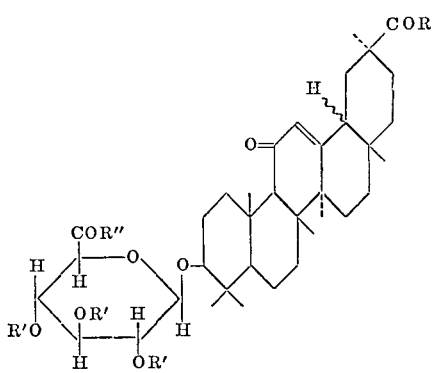

wherein R is a member selected from the group consisting of hydroxy and alkoxy of up to 6 carbon atoms, R' is a member selected from the group consisting of a hydrogen atom, alkanoyl of up to 3 carbon atoms and benzoyl and R" is a member selected from the group consisting of hydroxy, alkoxy of up to 6 carbon atoms, amino and amino substituted by at least one alkyl group containing up to 6 carbon atoms, and the alkali metal, alkaline earth metal, ammonium, aluminum and iron salts of those compounds in which at least one of R and R" is hydroxy.

2. Methyl (methyl-18β-glycyrrhet-3β-yl-2',3',4'-tri-O—acetyl-β-D-glucopyranosid)-uronate.

3. Methyl (18β - glycyrrhet-3β-yl-β-D-glucopyranosid)-uronic acid amide.

4. Methyl (18β - glycyrrhet-3β-yl-β-D-glucopyranosid)-uronate.

5. Sodium (methyl -18β - glycyrrhet-3β-yl-β-D-glucopyranosid)-uronate.

6. Methyl (18β - glycyrrhet-3β-yl-2',3',4'-tri-O—acetyl-β-D-glucopyranosid)-uronate.

7. Potassium (potassium 18β-glycyrrhet-3β-yl-β-D-glucopyranosid)-uronate.

References Cited
UNITED STATES PATENTS

| | | | |
|---|---|---|---|
| 3,046,195 | 7/1962 | Zagt, Jr. | 260—210 |
| 3,442,911 | 5/1969 | Baxendale | 260—210 |

LEWIS GOTTS, Primary Examiner

J. R. BROWN, Assistant Examiner

U.S. Cl. X.R.

424—180